United States Patent
Cho et al.

(10) Patent No.: US 9,535,546 B2
(45) Date of Patent: Jan. 3, 2017

(54) COVER DEVICE HAVING INPUT UNIT AND PORTABLE TERMINAL HAVING THE COVER DEVICE

(71) Applicant: Samsung Electronics Co., Ltd., Gyeonggi-do (KR)

(72) Inventors: Chi-Hyun Cho, Gyeonggi-do (KR); Hee-Sung Kim, Gyeonggi-do (KR); Chang-Ryong Heo, Gyeonggi-do (KR); Hyun-Ju Hong, Gyeonggi-do (KR)

(73) Assignee: SAMSUNG ELECTRONICS CO., LTD, Suwon-Si, Gyeonggi-Do (KR)

( * ) Notice: Subject to any disclaimer, the term of this patent is extended or adjusted under 35 U.S.C. 154(b) by 100 days.

(21) Appl. No.: 14/302,369

(22) Filed: Jun. 11, 2014

(65) Prior Publication Data

US 2014/0362044 A1    Dec. 11, 2014

(30) Foreign Application Priority Data

Jun. 11, 2013  (KR) .................. 10-2013-0066670

(51) Int. Cl.
| | | |
|---|---|---|
| *G06F 3/045* | (2006.01) | |
| *G06F 3/044* | (2006.01) | |
| *G06F 1/16* | (2006.01) | |
| *G06F 3/023* | (2006.01) | |

(52) U.S. Cl.
CPC ............ *G06F 3/044* (2013.01); *G06F 1/1626* (2013.01); *G06F 1/1643* (2013.01); *G06F 1/1669* (2013.01); *G06F 3/0231* (2013.01)

(58) Field of Classification Search
CPC ............ G06F 3/033; G06F 3/02; G06F 3/041; G06F 3/045; G06F 3/042; G06F 3/043; G09G 5/08; G09G 5/00
USPC ........................................ 361/679.27, 679.29
See application file for complete search history.

(56) References Cited

U.S. PATENT DOCUMENTS

| | | | | |
|---|---|---|---|---|
| 5,189,403 A | * | 2/1993 | Franz ................... | G05G 9/047 345/168 |
| 6,748,005 B1 | * | 6/2004 | Riazi ................... | H04B 1/7136 348/492 |
| 6,778,382 B2 | * | 8/2004 | Yim ..................... | G06F 1/1616 345/82 |
| 6,798,649 B1 | * | 9/2004 | Olodort ................ | G06F 1/1618 235/61 R |
| 8,531,827 B2 | * | 9/2013 | Huang .................. | G06F 1/1654 361/679.26 |
| 2009/0141439 A1 | * | 6/2009 | Moser .................. | G06F 1/1616 361/679.29 |
| 2013/0076635 A1 | * | 3/2013 | Lin ....................... | G06F 1/1662 345/169 |

(Continued)

FOREIGN PATENT DOCUMENTS

EP          2259429 A2    12/2010
KR    10-2012-0038415    4/2012

*Primary Examiner* — Pegeman Karimi

(57) ABSTRACT

A cover device having an input unit and a portable terminal having the cover device are provided. The cover device includes a cover unit divided into a plurality of areas, each area having an electrode. A connection surface is provided in the cover unit and configured to be detachably engaged with a terminal to which the cover unit is mounted. The input unit including an electrode line is configured to transmit a touch input signal to a touch panel of the terminal through an electrode of a touched area among the plurality of areas.

21 Claims, 9 Drawing Sheets

(56) References Cited

U.S. PATENT DOCUMENTS

2014/0240234 A1\* 8/2014 Bylander .............. G06F 3/0426
  345/168

\* cited by examiner

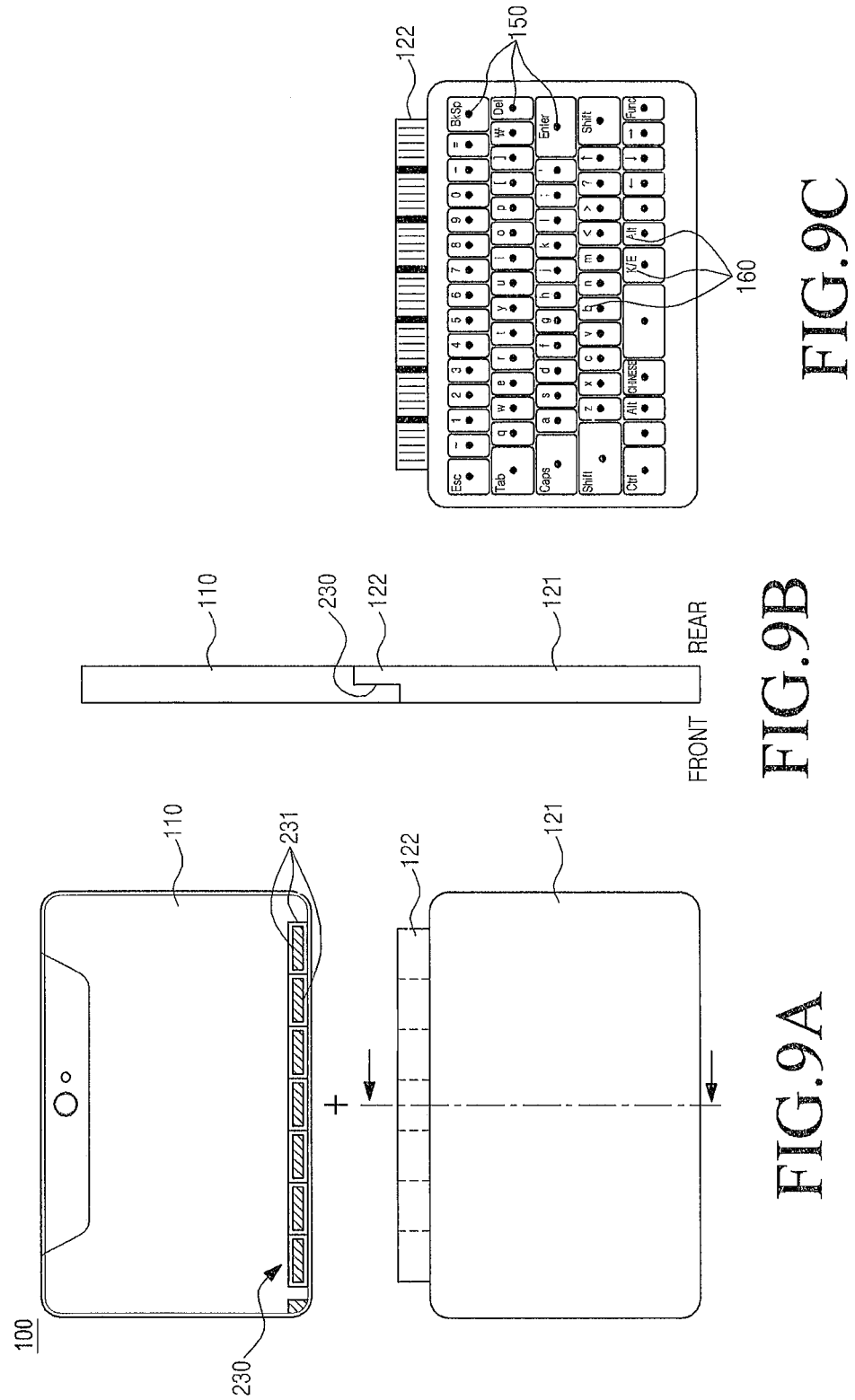

COVER DEVICE HAVING INPUT UNIT AND PORTABLE TERMINAL HAVING THE COVER DEVICE

CROSS-REFERENCE TO RELATED APPLICATION(S) AND CLAIM OF PRIORITY

The present application is related to and claims the benefit under 35 U.S.C. §119(a) of a Korean patent application 10-2013-0066670 filed on Jun. 11, 2013 in the Korean Intellectual Property Office, the entire disclosure of which is incorporated hereby by reference.

TECHNICAL FIELD

The present disclosure relates to a cover device having an input unit and a portable terminal having the cover device.

BACKGROUND

An electronic device, particularly a portable terminal refers to a device with which a user communicates with another user or connects to a service provided by a service provider through a mobile communication base station, while carrying the device. Along with the development of mobile communication technology and the information and communication industry, the portable terminal has rapidly broadened its service area. For example, early-stage mobile communication services were limited to paging, voice call, short message transmission, and the like. Now the service area of the portable terminal is extended to multimedia service including a video, entertainment service including gaming, and financial service including mobile banking. Furthermore, portable terminals become necessities to almost all age groups ranging from teens to elderly people.

Over the past few years, multimedia service has been reinforced through portable terminals and portable terminals such as a smart phone or a tablet PC have achieved performance close to that of a Personal Computer (PC). Accordingly, users can access the Internet, view videos, and handle business through smart phones or tablet PCs, while moving. In addition, as a display device having a touch screen has substituted for a keyboard having physical switches, portable terminals have been equipped with smaller, advanced display devices.

To extend the functions of a smart phone or a tablet PC, various additional devices are used. For example, the additional devices range from a simple device such as a cradle on which a portable terminal is placed during charging or which provides user convenience during execution of a multimedia function to a docking station on which a portable terminal is connected to an external audio or video device. An audio device with which a portable terminal is docked plays back a file stored in a storage medium such as a Compact Device (CD). Compared to an ordinary audio storage medium, a user can store an intended file freely in the portable terminal. Therefore, if a user has a docking station equipped with an audio device function, the user can enjoy rich multimedia content through a portable terminal.

Another type of additional device is an input device provided to a portable terminal, particularly an input device that extends and adds a keyboard for the portable terminal. Since a smart phone or a tablet PC has performance almost equal to that of a home computer or an office computer, the smart phone or the tablet PC is sufficient for simple business work or Web surfing. The smart phone or the tablet PC outperforms a laptop computer in terms of mobility. The use of an additional input device connectable to a portable terminal such as a smart phone or a tablet PC can increase user convenience. That is, the additional input device enables the user to use the portable terminal substantially with the same performance of a laptop computer.

However, the additional input device is rather inconvenient in terms of portability in view of its volume or power-related issues. Aside from a power supply for the portable terminal, the additional input device requires a power device. Moreover, to apply an input signal to the portable terminal with the additional input device, pogo pins or a Bluetooth device is required.

If the additional input device is connected through connectors such as pogo pins, the input device should have a predetermined thickness, for stable engagement with an electronic device, as well as it needs a power device. As a result, the input device is less portable.

If the input device is docked with the portable terminal by Bluetooth, both the portable terminal and a docking station need Bluetooth modules for communication. In addition, the input device needs a power device and gets thicker, thus decreasing its portability.

While the portable terminal is being carried or used, an exterior case of the portable terminal or a display device exposed from the front surface of the portable terminal is vulnerable to scratches or impact-caused damage. To prevent such damages, various cases or covers (hereinafter, referred to as cover devices) are provided to portable terminals. Previously, a cover device that covers a portable terminal is configured so as to cover only the periphery of the portable terminal or only the rear case of the portable terminal, while exposing a display part. Or the cover device is configured to open or cover the display device of the portable terminal, while covering the entirety of the portable terminal with a flip case (referred to as a flip cover). The flip cover simply covers the portable terminal, in engagement with the portable terminal.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a cover device that integrates a cover unit configured in consideration of portability of a portable terminal with an input device enabling a user to apply an input to the portable terminal besides an input through the portable terminal itself, and a portable device having the cover device.

Another aspect of the present disclosure is to provide a cover device in which an input unit on a surface of a cover unit is exposed by rotating the cover unit so as to apply an input to a portable terminal simply by touching the input unit, thus obviating the need for an additional power supply, and which allows an input to the portable terminal through a simple structure and connection, and a portable terminal having the cover device.

In accordance with an aspect of the present disclosure, a cover device having an input unit is provided. The cover device includes a cover unit divided into a plurality of areas, each area having an electrode, a connection surface provided in the cover unit and detachably engaged with a terminal to which the cover unit is mounted, and the input unit including an electrode line to transmit a touch input signal to a touch panel of the terminal through an electrode of a touched area among the plurality of areas.

In accordance with another aspect of the present disclosure, a portable terminal having a cover device with an input unit is provided. The portable terminal includes a body having a touch panel, a sensing unit provided in the body and detachably engaged with a connection surface of the cover device, to detect a signal through an electrode line formed in the connection surface, and a controller configured to identify an input of at least one key according to a set of signals received from the sensing unit.

In accordance with another aspect of the present disclosure, a device is provided. The device includes a body having a touch panel, a cover unit divided into a plurality of areas, each area having an electrode in the body, a connection surface provided in the cover unit and detachably engaged with the body, electrode lines, each electrode line connecting an electrode to the connection surface to transmit a signal from the electrode to the connection surface, a sensing unit provided in the body and detachably engaged with the connection surface, to detect a signal from an electrode line, and a controller configured to receive signals from the sensing unit and to recognize an input of at least one key based on a set of the signals.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A, 9B and 9C illustrate another example of the cover unit having an input unit in the device illustrated in FIG. 7.

Throughout the drawings, like reference numerals will be understood to refer to like parts, components, and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure will be provided to achieve the above-described technical aspects of the present disclosure. In an exemplary implementation, defined entities may have the same names, to which the present disclosure is not limited. Thus, exemplary embodiments of the present disclosure can be implemented with same or ready modifications in a system having a similar technical background.

Figure 1:
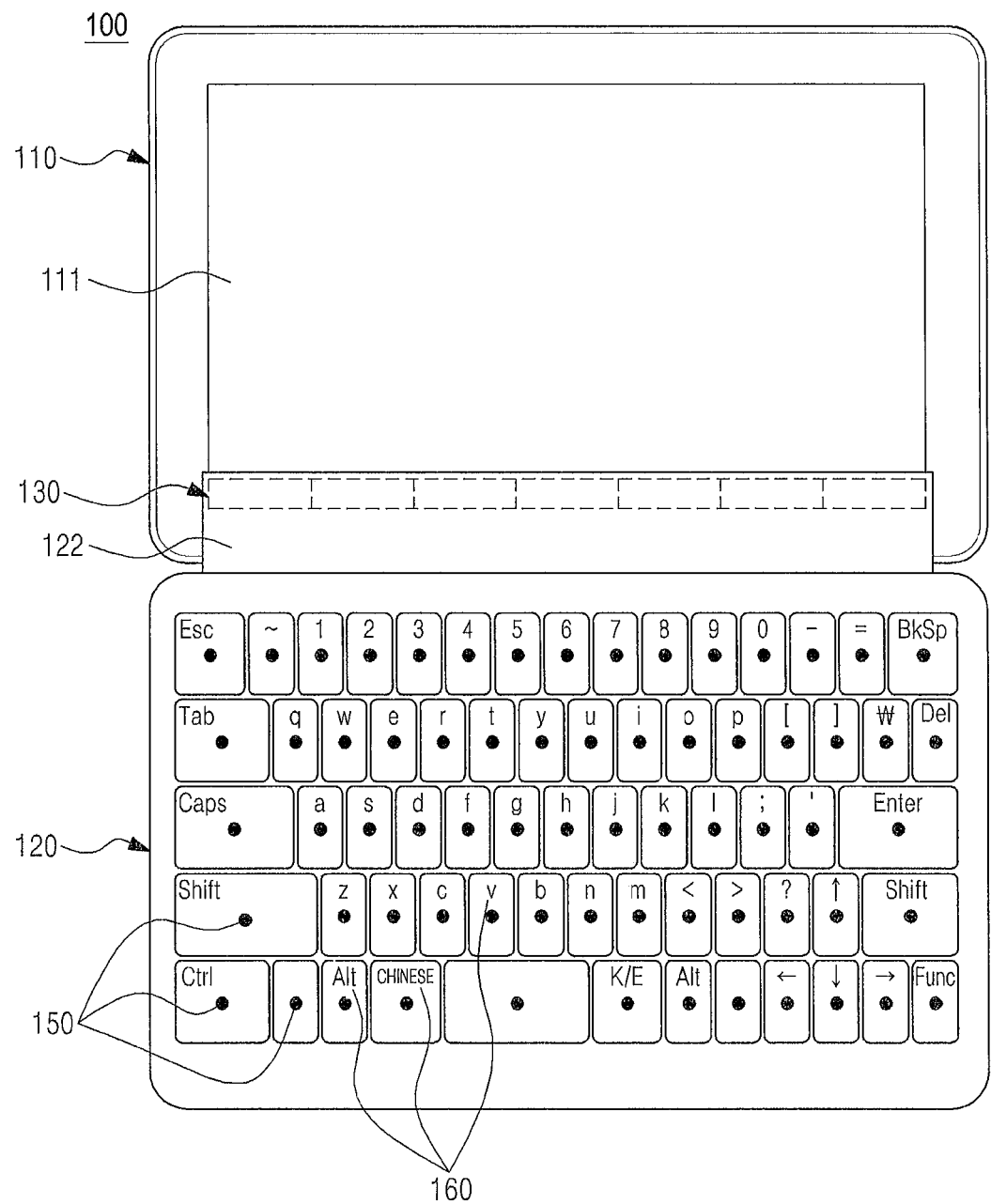
FIG. 1 illustrates a portable terminal having an input device according to an embodiment of the present disclosure.

FIG. 1 illustrates a portable terminal having an input device according to an exemplary embodiment of the present disclosure, and FIGS. 2A, 2B and 2C illustrate a disconnected state of the device of FIG. 1, a side section of a cover unit in the disconnected state, and a side section of the cover unit in a connected state.

Figure 2:
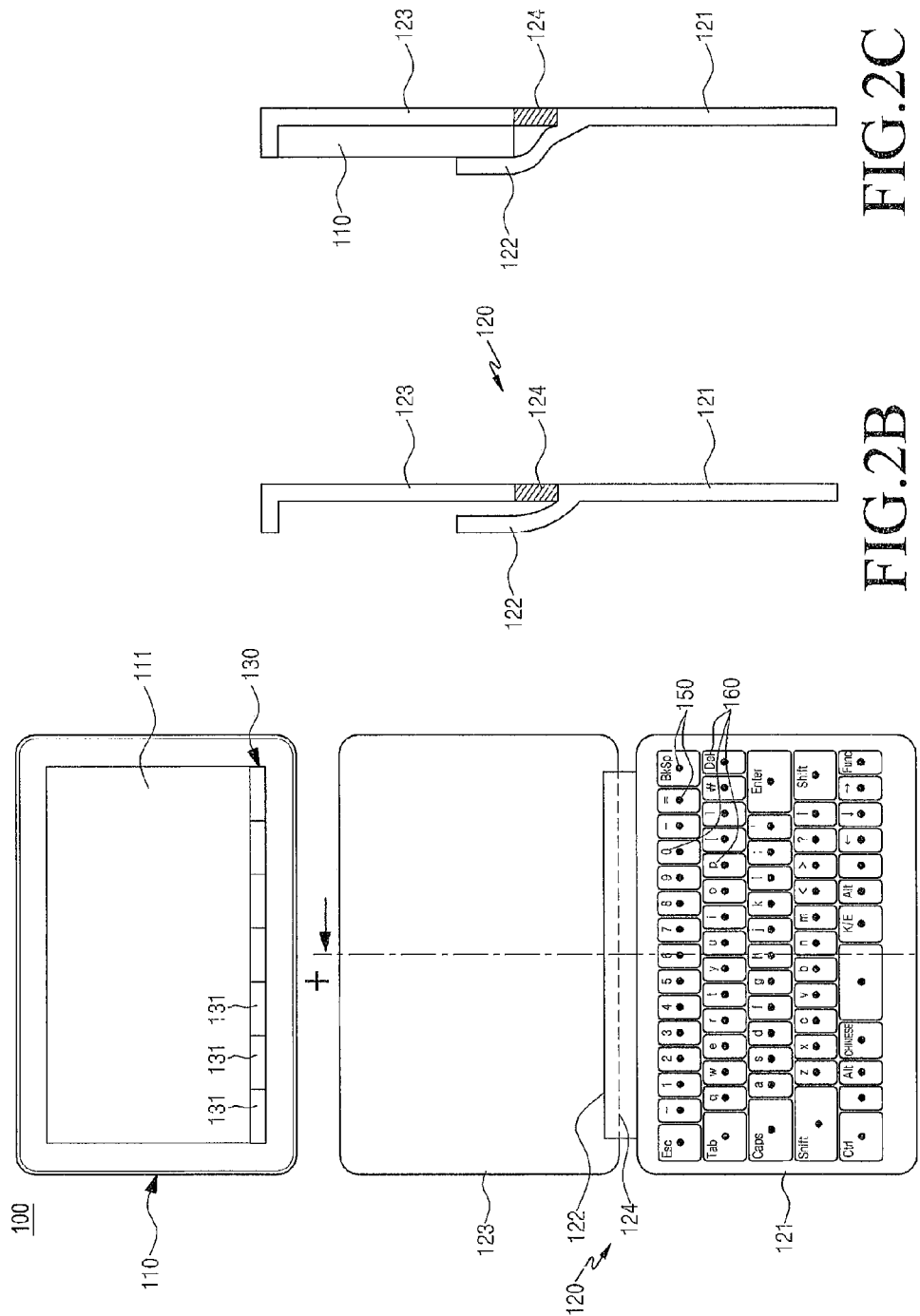
FIGS. 2A, 2B and 2C illustrate a disconnected state of the device of FIG. 1, a side section of a cover unit in the disconnected state, and a side section of the cover unit in a connected state, respectively.

Referring to FIGS. 1 to 2C, a device 100 according to an exemplary embodiment of the present disclosure includes a body 110, a cover unit 120 that applies an input to the body 110, and modules that enable an input to the body 110, specifically a sensing unit 130, a connection surface 122, and a touch sensing unit 150.

A large display module is provided on a front surface of the body 110, to display a screen. Although the display module can be divided into a display unit and a touch panel that senses a signal in response to a touch on the display unit or proximity to the display unit, the display unit and the touch panel are collectively referred to as a touch panel 111. As described above, the touch panel 111 has a large touch screen (hereinafter, referred to as a 'touch surface') on its front surface, to display a screen. The touch panel 111 is configured to generate an input signal by sensing a touch on or proximity to the touch screen. The sensing unit 130 is provided at a portion of the touch panel 111 and connected to the connection surface 122, to receive a signal from the touch sensing unit 150.

The sensing unit 130 can be configured separately from the touch panel 111. Alternatively, the sensing unit 130 can be incorporated into the touch panel 111 so that the touch panel 111 is used as in the exemplary embodiment of the present disclosure. That is, while not shown, the sensing unit 130 can be formed along the periphery of a portion of the touch panel 111 in order to respond to the touch sensing unit 150. As the sensing unit 130 is formed along the portion of the touch panel 111 to use a sensing signal generated at the portion of the touch panel 111, the sensing unit 130 can receive signals from the touch sensing unit 150 through the connection surface 122 and can combine the signals. As described later, as far as the sensing unit 130 generates binary signals '0' and '1' depending on signal reception or non-reception from the touch sensing unit 130, a cover device having an input unit according to the present disclosure can be provided. Therefore, an existing touch panel can be used as the touch panel 111. That is, the sensing unit 130 can be formed at the portion of the touch panel 111 by installing a specific application that can sense a touch, in order to sense signal generation at electrodes 151.

The sensing unit 130 includes a plurality of signal sensing surfaces 131 arranged at predetermined intervals on the front surface of the body 110, particularly the touch panel 111. Each of the signal sensing surfaces 131 outputs a binary signal '0' or '1' depending on signal reception or non-reception. That is, in the absence of an input signal, each signal sensing surface 131 outputs a binary signal '0' and in the presence of an input signal, the signal sensing surface 131 outputs a binary signal '1'. A controller 170 detects a predetermined key input value mapped to a set of signals output from the signal sensing surfaces 131 and outputs the key input value to the touch panel 111 (see FIGS. 4 and 5), as described later. That is, a touched input key 160 is recognized based on a key input value mapped to a set of signals generated based on signal detection or non-detection at the signal sensing surfaces 131. In an exemplary embodiment of the present disclosure, an electrode line 152 is connected to each of the signal sensing surfaces 131, to transfer a signal from an electrode 151 to the signal sensing surface 131. Particularly, each electrode 151 has two electrode lines 152 connected to different signal sensing surfaces 131, as described later.

As described before, since the sensing unit 130 is provided on the touch panel 111 and connected to the electrode lines 152 of the connection surface 152, the sensing unit 130 receives a signal generated from an input key 160. To form the sensing unit 130 on the touch panel 111, a specific function of providing the sensing unit 130, particularly a specific function of defining the plurality of signal sensing surfaces 131 on the body 110 can be executed. That is, a specific function, for example, a specific application (not shown) of generating the sensing unit 130 on the touch panel 111 can be provided. Upon execution of the specific application on the touch panel 111, the controller 170 controls creation of the plurality of signal sensing surfaces 131 at an end of the touch panel 111. As a result, the signal sensing surfaces 131 are formed at the end of the touch panel 111 and the electrode lines 152 are connected to the signal sensing surfaces 131 on the connection surface 122.

While a cover device readily carried in a portable terminal is configured to have an input unit or a connection surface in the exemplary embodiment of the present disclosure, this should not be construed as limiting the present disclosure. That is, as far as a cover device having an input unit or a connection surface is readily carried in a portable terminal and connected to the body of the portable terminal, particularly the sensing unit 130, various configurations are available to the cover device. As stated before, each of the signal sensing surfaces 131 generates a binary signal '0' or '1' depending on whether the signal sensing surface 131 detects an input signal and the resulting set of binary signals generated from the signal sensing surfaces 131 represents a key input value. Accordingly, the sensing unit 130 has $2^N$ signal sets according to signals generated from the signal sensing surfaces 131 and thus the controller 170 recognizes $2^N$ key input values.

Specifically, if the number of signal sensing surfaces 131 is N, the sensing unit 130 can sense $2^N$ signal sets. Thus, the $2^N$ signal sets can be mapped to $2^N$ key input values, which means that up to $2^N$ input keys 160 can be provided in the cover unit 120. For example, if 64 keys 160 are needed, 6 signal sensing surfaces 131 are defined. Since $2^6$ (=64) signal sets can be produced by combining '0s' and '1s', 64 different key input values can be defined and thus 64 keys 160 can be provided, which will be described later in greater detail.

As described before, the sensed value of each signal sensing surface 131 is a binary value '0' or '1'. Depending on sensed values of the signal sensing surfaces 131, $2^N$ different key input values can be produced. The controller 170 detects a predetermined key input value mapped to a signal set of the signal sensing surfaces 131 and outputs the key input value of a touched input key 160 (see FIGS. 4 and 5). Specifically, if a signal sensing surface 131 senses a signal, it outputs '1' and if the signal sensing surface 131 does not sense a signal, it outputs '0'. The sensing unit 130 is connected to electrodes 150 so that each of the signal sensing surfaces 131 can generate the binary signal '0' or '1'. In this manner, the input keys 160 have different key input values corresponding to different signal sets. That is, the sensing unit 130 combines signal values '0s' and '1s' and the controller 170 detects a key input value corresponding to the signal set, recognizes an input key 160 having the key input value, and outputs the key input value to the touch panel 111. For example, if 7 signal sensing surfaces 131 are provided as in the exemplary embodiment of the present disclosure, the sensing unit 130 can produce $2^N$ (i.e. $2^7$) different signal sets out of combinations of '0s' and '1s' at the signal sensing surfaces 131, thus sensing $2^N$ (i.e. $2^7$) different input keys 160.

As stated before, as far as the sensing unit 130 generates '0' or '1' depending on signal reception or non-reception, the cover unit according to embodiments of the present disclosure can be provided. Accordingly, an existing touch panel can be used as the touch panel 111. That is, because the touch panel 111 senses a touch, the sensing unit 130 that can sense signal generation from an electrode 151 can be created at a portion of the touch panel 111 by a specific application. The connection surface 122 contacts the sensing unit 130 generated at the portion of the touch panel 111. Thus an electrode 151 can transmit a signal to the sensing unit 130, particularly to signal sensing surfaces 131 through the connection surface 122.

The cover unit 120 is detachably engaged with the body 110. The cover unit 120 is configured to cover the front surface of the touch panel 111 by rotating with respect to a portion of the body 1110. In an exemplary embodiment of the present disclosure, the cover unit 120 is a flip cover, by way of example. That is, the cover unit 120 includes a rear cover 123 covering the rear surface of the body 110, a front cover 121 covering the front surface of the body 110, particularly the touch panel 111, and a connection member 124 connecting the front cover 121 to the rear cover 123 rotatably, as illustrated in FIGS. 2A, 2B and 2C. The rear cover 123, which is formed of a hard plastic material, is fixed to the rear surface of the body 110 to protect the rear surface of the body 110. The rear cover 123 can be incorporated into the body 110, as a rear case covering a battery mounted in the rear surface of the body 110. It is also possible to provide the rear cover 123 over a rear case that is mounted onto the rear surface of the body 110 to cover the battery. That is, the shape or structure of the rear cover 123 can be modified in various manners, taking into account the shape or design of the cover unit 120 provided in the body 110.

The front cover 121 and the connection member 124 are formed of a hard compressed cloth or paper material and are soft on their inner surfaces. When the front cover 121 is folded over the touch panel 111, the front surface of the touch panel 111 can be protected against scratches or the like. The touch sensing unit 150 having the electrodes 151 and the electrode lines 152 is mounted on the front cover 121. The touch sensing unit 150 can be an Indium Tin Oxide (ITO) panel, for example.

If the cover unit 120 is a flip cover as in the exemplary embodiment of the present disclosure, the cover unit 120 can be provided separately from the body 110 or integrally engaged with the body 110. In the former case, the rear cover 123 is incorporated into the body 110, as a rear case covering the rear surface of the body 110, making it possible to decrease the total thickness of the body 110 engaged with the cover unit 120, that is, the device 100. In the latter case, the rear cover 123 is mounted to the rear surface of the body 110 having a rear case.

Figure 3:
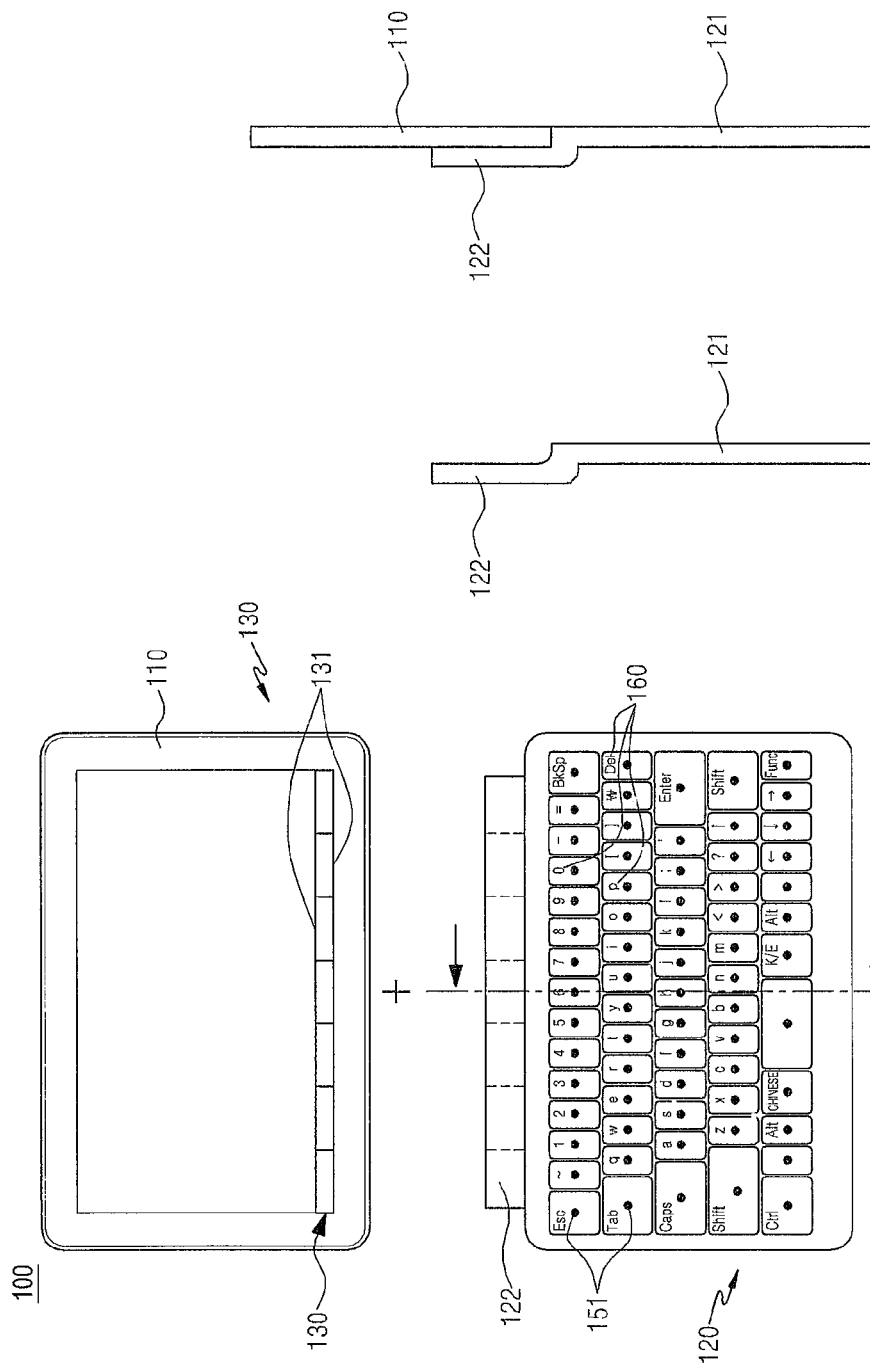
FIGS. 3A, 3B and 3C illustrate another example of the cover unit having an input unit in the device illustrated in FIGS. 2A, 2B and 2C.

FIGS. 3A, 3B and 3C illustrate another example of the cover unit having the input unit in the device illustrated in FIGS. 2A, 2B and 2C. Referring to FIGS. 3A, 3B and 3C, the cover unit 120 can be configured so as to cover only the front surface of the body 110. That is, only the front cover 121 is provided to cover the front surface of the touch panel 111. A surface of the cover unit 120 illustrated in FIGS. 2A to 3C, facing the touch panel 111, is divided into a plurality of areas in which the input keys 160 are patterned. The electrodes 151 are formed in the respective areas and the electrode lines 152 are formed to transmit signals from the electrodes 151 in the areas.

Specifically, the touch sensing unit 150 can be an ITO panel that changes a capacitance upon user touch on an input key 160. The touch sensing unit 150 includes the electrodes 151 and the electrode lines 152. The input keys 160 are patterned in the areas corresponding to the positions of the respective electrodes 151. In exemplary embodiments of the present disclosure, the input keys 160 are patterned in a QWERTY layout on the surface of the front cover 121. Thus, an input unit having the QWERTY key layout is formed on the surface of the cover unit 120. The touch sensing unit 150 also has the QWERTY layout in correspondence with the QWERTY arrangement of the input keys 160. For example, if 68 input keys 160 are arranged in the QWERTY layout, 68 electrodes 151 are arranged in correspondence with the positions of the input keys 160 and the electrode lines 152 run from the electrodes 151 to the connection surface 122.

As described before, the touch sensing unit 150 includes the electrodes 151 each changing a capacitance upon user touch on an input key 160, and the electrode lines 152 connected between the electrodes 151 and the connection surface 122 to transmit signals from the electrodes 151 to the signal sensing surfaces 131. In an exemplary embodiment of the present disclosure, each electrode 151 is connected to two electrode lines 152 which run to different segments of the connection surface 122 and thus to two different signal sensing surfaces 131. An electrode 151 corresponding to at least one of the plurality of areas in which the input keys 160 are patterned experiences a capacitance change, upon generation of a touch in the at least one area. Then, the capacitance change value is provided to two different signal sensing surfaces 131 via two electrode lines 152 connected to the electrode 151. As a result, the plurality of signal sensing surfaces 131 are divided into signal sensing surfaces 131 that sense the capacitance change and signal sensing surfaces 131 that do not sense the capacitance change. Thus, at least one of $2^N$ signal sets is created based on the sensed values of the signal sensing surfaces 131. The controller 170 recognizes the touched input key 160 based on the signal set of the sensing unit 130. In this manner, a user experience corresponding to the input key 160 is executed on the touch panel 111 or a character or signal corresponding to the input key 160 is input to the touch panel 111.

The connection surface 122 is formed in engagement with the sensing unit 130, at a portion of the cover unit 120, preferably at a portion of the front cover 121. The connection surface 122 is extended from the surface of the front cover 120 detachably mounted to the body 110 to the position of the sensing unit 130. The connection surface 122 is divided into a plurality of segments corresponding to the respective signal sensing surfaces 131.

The connection surface 122 is extended from the surface of the front cover 120 engaged with the body 110 to the sensing unit 130. The electrode lines 152 running from the electrodes 152 are connected to the respective signal sensing surfaces 131 in the connection surface 122. Electrode lines 152 are arranged in each segment. Electrode lines 152 connected to at least one segment are connected to a signal sensing surface 131 facing the segment and transmit a signal from an electrode 151 connected to the electrode lines 152 to the signal sensing surface 131. The electrode lines 152 transmit a signal corresponding to a capacitance change occurring in the electrode 151 connected to the electrode lines 152 to the signal sensing surface 131 connected to the electrode lines 152.

Figure 4:
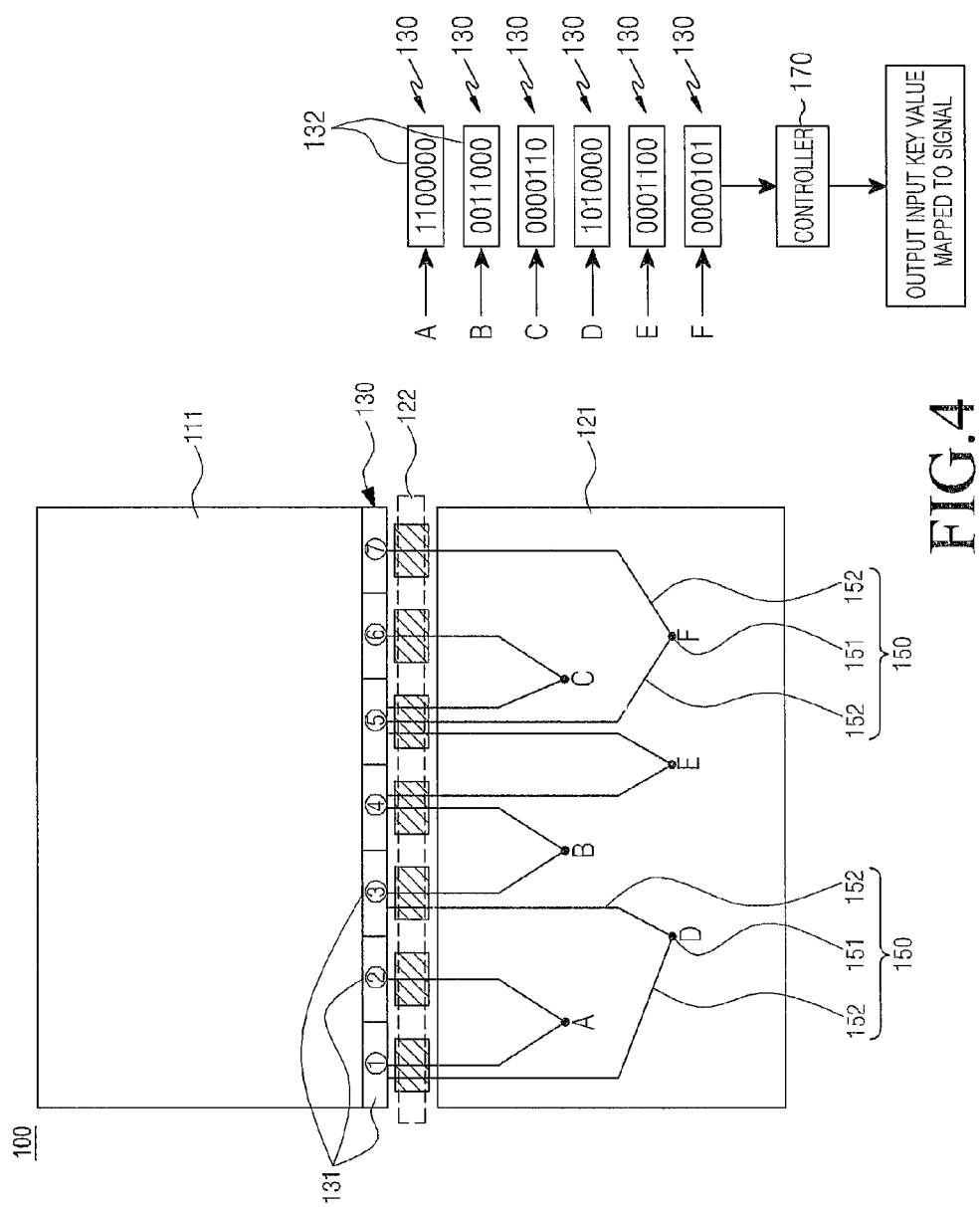
FIG. 4 illustrates a signal input state of a cover device having the input unit illustrated in FIG. 1 and the portable terminal having the cover device according to embodiments of the present disclosure.
Figure 5:
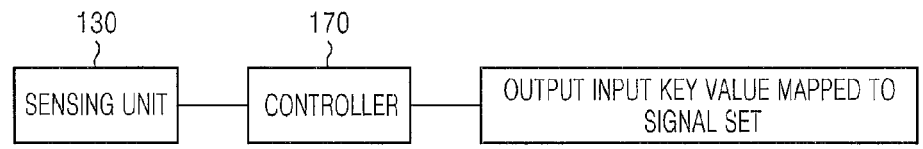
FIG. 5 is a block diagram illustrating an operation of outputting a signal to a touch panel according to a signal received from a sensing unit at a controller in the device illustrated in FIG. 1 according to embodiments of the present disclosure.

FIG. 4 illustrates a signal input state of a cover device having the input unit illustrated in FIG. 1 and the portable terminal having the cover device, and FIG. 5 is a block diagram illustrating an operation of outputting a signal to the touch panel according to a signal received from the sensing unit at the controller in the device illustrated in FIG. 1. Referring to FIGS. 4 and 5, when the segments of the connection surface 122 are connected to the signal sensing surfaces 131 corresponding to the positions of the segments, the electrodes 151 are placed in a state where a touch causes a capacitance change. Upon generation of a touch on an electrode 51, the electrode 151 provides a capacitance change value to signal sensing surfaces 131 through segments of the connection surface 122.

In the exemplary embodiment of the present disclosure, the electrode lines 152 of one electrode 151 are connected to at least one signal sensing surface 131, preferably two signal sensing surfaces 131 from among the 7 signal sensing surfaces 131, by way of example. When the cover unit 120, particularly the front cover 121 is unfolded from the touch panel 110, the input keys 160 on the surface of the front cover 121 are exposed and the connection surface 122 is connected to the sensing unit 130. Once the sensing unit 130 is connected to the connection surface 122, the touch sensing unit 150 is able to apply an input to the touch panel 111, upon generation of a touch. When the user touches an input key 160 in this state, the cover unit 120 engaged with the body 110 functions as an input device. Specifically, the cover unit 120 is carried in engagement with the body 110, thus having enhanced portability and the front cover 121 is engaged with the front surface of the body 110, thereby protecting the touch panel 111. To apply an input to the body 110 in this state, the front cover 121 is rotated and placed on a plane such as on a table. As the surface of the front cover 121 engaged with the touch panel 111 is exposed, the input keys 160 patterned on the surface of the front cover 121 are also exposed. The connection surface 122 is connected to the sensing unit 130 and the touch sensing unit 150 is placed in an input state. When the user touches an input key 160 exposed from the surface of the cover unit 120, a capacitance change occurs to an electrode 151 corresponding to the input key 160. A touch signal representing the capacitance change is input to at least one signal sensing surface 131, specifically two signal sensing surfaces 131 through the electrode lines 152 connected to the electrode 151. As described before, the signal sensing surfaces 131 sense or do not sense the signal and the resulting set of signals at the signal sensing surfaces 131 represents one key input value.

Referring to FIG. 4, for example, an electrode 151 at position A is connected to signal sensing surfaces 131 at positions ① and ② via two electrode lines 152, an electrode 151 at position B is connected to signal sensing surfaces 131 at positions ③ and ④ via two electrode lines 152, and an electrode 151 at position C is connected to signal sensing surfaces 131 at positions ⑤ and ⑥ via two electrode lines 152. An electrode 151 at position D is connected to the signal sensing surfaces 131 at positions ① and ③ via two electrode lines 152, an electrode 151 at position E is connected to signal sensing surfaces 131 at positions ④ and ⑤ via two electrode lines 152, and an electrode 151 at position. F is connected to signal sensing surfaces 131 at positions ⑤ and ⑦ via two electrode lines 152. When the user touches the input key 160 at position A, the capacitance of the electrode 151 at position A is changed. The capacitance change of the electrode 151 is provided to the signal sensing surfaces 131 at positions ① and ② via the two electrode lines 152 connected to the electrode 151. Thus, the signal sensing surfaces 131 at positions ① and ② detect a signal value caused by the touch on the electrode 151 at position A. That is, the touch at position A brings about a signal set '1100000' at the signal sensing surfaces 131. The sensing unit 130 recognizes the signal set of the signal sensing surfaces 131. That is, the sensing unit 130 recognizes the signal set '11000001' generated at the signal sensing surfaces 131 by the touch at position A. The controller 170 detects the key input value of the touched input key 160 mapped to the signal set and outputs the key input value of the input key 160 at position A to the touch panel 111. Specifically, a character or signal corresponding to the input key 160 at position A is input to the touch panel 111 or a user experience corresponding to the input key 160 at position A is executed on the touch panel 111. In FIG. 4, upon touches at positions B, C, D, E, and F as well as at position A, different signal sets are generated according to the positions. Then the controller 170 can identify predetermined key input values mapped to the signal sets sensed in the sensing unit 130 and output the key input values to the touch panel 111.

If the 68 input keys 160 are arranged in the QWERTY layout as illustrated in FIGS. 1 to 3C, the 7 signal sensing surfaces 131 should be arranged at predetermined intervals (e.g. equidistantly) on the touch panel 111 to recognize touches on the input keys 160. As described before, the sensing unit 130 should include the 7 signal sensing surfaces 131 that generate a binary signal '0' indicating signal non-detection, that is, an off state or a binary signal '1' indicating signal detection, that is, an on state and form signal sets mapped to the 68 input keys 160. In other words, the number N of signal input surfaces 131 is determined such that the required number of input keys 160 is equal to or less than $2^N$. For example, up to 64 input keys 160 can be realized by means of 6 signal sensing surfaces 131. In the exemplary embodiment of the present disclosure, up to 128 input keys 160 can be realized by 7 signal sensing surfaces 131.

Figure 6:
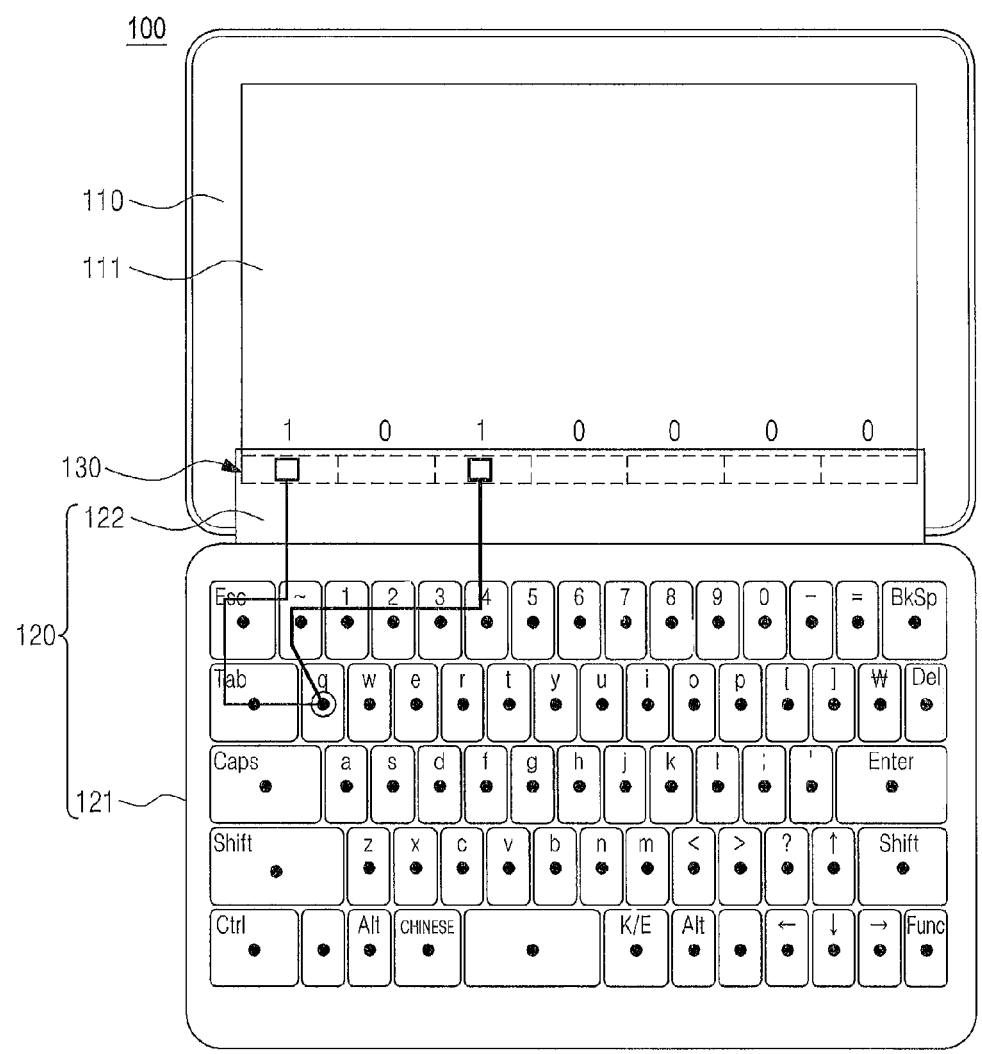
FIG. 6 illustrates generation of a user input in the device illustrated in FIG. 1 according to embodiments of the present disclosure.

FIG. 6 illustrates generation of a user input in the device illustrated in FIG. 1. Referring to FIG. 6, the electrodes 151 corresponding to the respective input keys 160 are connected to the signal sensing surfaces 131 via the electrode lines 152. As stated before, each electrode 151 is connected to two different signal input surfaces 131. When a user input is generated from an input key 160, specifically when the user touches the input key 160, the electrode 151 at the position of the touched input key 160 experiences a change in capacitance and a signal representing the capacitance change is provided to two different signal sensing surfaces 131 connected to the electrode 151. Therefore, the two signal sensing surfaces 131 detect the input signal among the 7 signal sensing surfaces 131. The signal sensing surfaces 131 that do not detect the input signal output signals '0s' and the signal sensing surfaces 131 that detect the input signal output signals '1s'. The sensing unit 130 detects a signal set having 7 signals of 0s and 1s and the controller 170 outputs the key input value of the touched input key 160 mapped to the signal set to the touch panel 111. Therefore, the touch panel 111 displays an input corresponding to the input key 160 or executes a user experience corresponding to the input key 160 on a screen.

Referring to FIG. 6, for example, if the user touches a 'ㅂ/q' input key 160, the electrode 151 at the position of 'ㅂ/q' experiences a change in capacitance. Two signal sensing surfaces 131 connected to the electrode 151 at the position of 'ㅂ/q' receive a signal representing the capacitance change of the electrode 151 via electrode lines 152. That is, since the 'ㅂ/q' electrode 151 is connected to the signal sensing surfaces 131 at positions ① and ③, the sensed values of the signal sensing surfaces 131 at positions ① and ③ are 1s. Thus, a signal set generated at the signal sensing surfaces 131 is '1010000'. The sensing unit 130 senses the signal set '1010000' and the controller 170 recognizes the touched input key 160 based on the signal set '1010000'.

Accordingly, the cover unit having an input device function according to the exemplary embodiment of the present disclosure does not need an additional power source in applying an input to the touch panel. In other words, as the electrode lines 152 are connected to the signal sensing surfaces 131, the touch sensing unit 150 senses a user touch and the sensed input is applied to the touch panel 111. In addition, since the cover unit 120 can apply an input simply with the structure of the touch sensing unit 150, the cover unit 120 can get slim and lightweight, thus enhancing portability. Furthermore, the cover unit 120 can be carried with the user, attached to the body 110, thus facilitating the use of the input device.

Now a description will be given of another embodiment of the device 100. The device 100 according to another exemplary embodiment is, different in terms of the position of the sensing unit 130. While the sensing unit 130 is configured on the touch panel 111 on the front surface of the body 100 in the foregoing exemplary embodiment of the present disclosure, a sensing unit 230 is provided on the rear surface of the body 110 in this exemplary embodiment of the present disclosure.

The same components and operations of the device 100 according to another exemplary embodiment of the present disclosure will be pursuant to the description of the counterparts of the device 100 according to the foregoing exemplary embodiment of the present disclosure.

Figure 7:
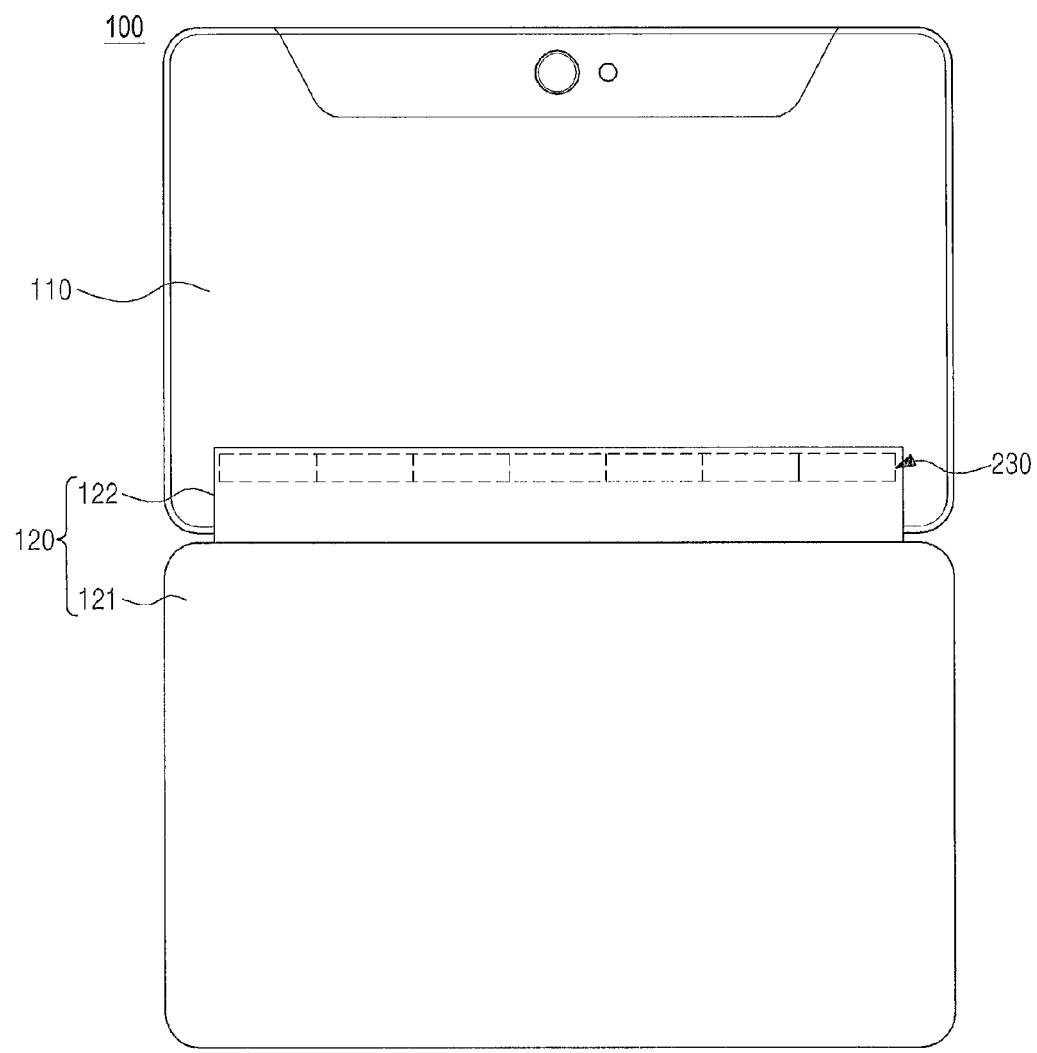
FIG. 7 illustrates a device according to another embodiment of the present disclosure.

FIG. 7 illustrates a device according to another embodiment of the present disclosure. Referring to FIG. 7, the sensing unit 230 is provided on the rear surface of the body 110, particularly at an edge of the rear surface of the body 110. The connection surface 122 is connected to the rear surface of the body 110. To sense a signal representing a capacitance change of an electrode 150, the sensing unit 230 has a plurality of sensors 231 arranged at predetermined intervals (e.g. equidistantly). The sensors 231 can be capacitive sensors such as grip sensors. That is, the capacitance of an electrode 151 at a touched position in the touch sensing unit 150 is changed and the capacitance change is provided to at least one sensor 231 via electrode lines 152 connected to the electrode 151. The sensors 231 output a signal set of 0s and 1s according to their detection or non-detection of the input value. As described before, N sensors 231 can output up to 2N signal sets according to the presence or absence of a sensed value. The sensing unit 230 senses the signal set from the sensors 231. The controller 170 detects a key input value mapped to the signal set received from the sensing unit 230 and outputs the key input value to the touch panel 111 (see FIG. 5).

Figures 8B, 8C:
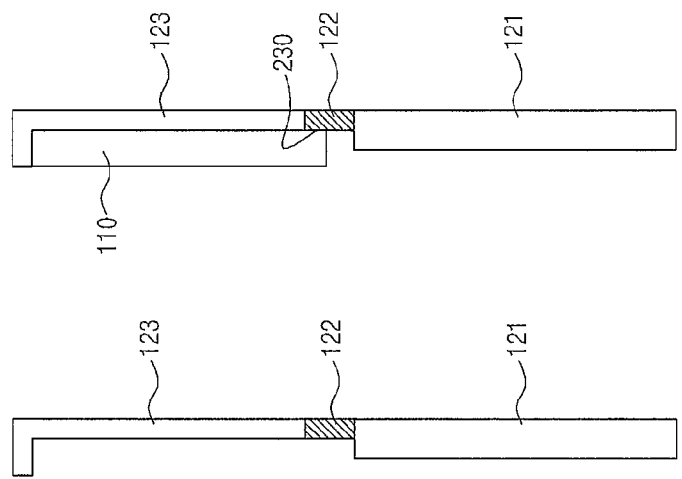
FIGS. 8A, 8B and 8C illustrate a disconnected state of the device illustrated FIG. 7, a side section of a cover unit in the disconnected state, and a side section of the cover unit in a connected state according to embodiments of the present disclosure.
Figure 8A:
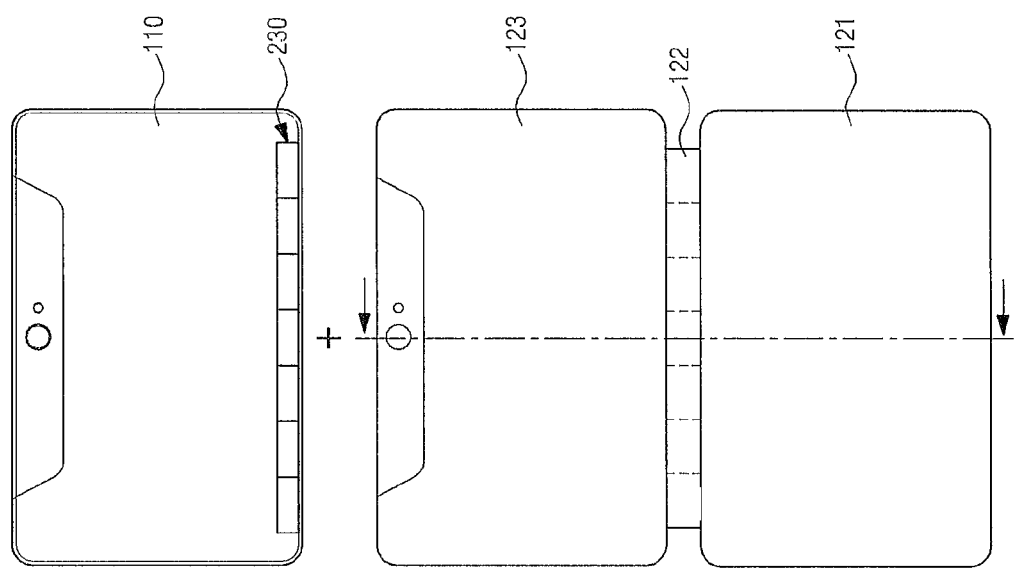

FIGS. 8A, 8B and 8C illustrate a disconnected state of the device illustrated FIG. 7, a side section of a cover unit in the disconnected state, and a side section of the cover unit in a connected state, and FIGS. 9A, 9B and 9C illustrate another example of the cover unit having an input unit in the device illustrated in FIG. 7.

Referring to FIGS. 8A to 9C, the device 100 includes the body 110 of the portable terminal and the cover unit 120 detachably engaged with the body 110, which covers the body 110. A docking station being a cover with an input unit is detachably provided. The configurations of the body 110 and the cover unit 120, the number of the sensors 231, and an operation of recognizing an input key at the sensing unit 230 are identical to those of the device 100 according to the foregoing exemplary embodiment of the present disclosure.

For example, since 68 input keys 160 are arranged in the QWERTY layout (see FIG. 7), 7 sensors 231 are arranged spaced from one another by a predetermined distance on the rear surface of the body 110 so that touches on the 68 input keys 160 can be recognized, as in the foregoing exemplary embodiment of the present disclosure. The capacitance of an electrode 151 corresponding to a touched input key 160 is changed and the changed capacitance value is transmitted to sensors 231 connected to the electrode 151 via electrode lines 152. Each of the sensors 231 outputs a binary signal '0' indicating an off state in the absence of a sensed value or a binary signal '1' indicating an on state in the presence of a sensed value. The sensing unit 230 can recognize the touched input key 160 based on a signal set received from the sensors 231.

In the exemplary embodiment of the present disclosure, the number N of sensors 231 is determined such that the required number of input keys 160 is equal to or less than $2^N$. For example, if there are 6 sensors 231, up to 64 input keys 160 can be provided. If there are 7 sensors 231, up to 128 input keys 160 can be provided. When the user touches the 'ㅂ/q' input key 160, the electrode 151 at the position of 'ㅂ/q' experiences a change in capacitance. Two signal sensors 231 connected to the electrode 151 at the position of 'ㅂ/q' receive the capacitance change of the electrode 151 via electrode lines 152. Thus sensors 231 that do not detect the sensed value output '0s' and sensors 231 that detect the sensed value output '1s'. The sensing unit 230 senses a set of signals received from the sensors 231. The controller 170 recognizes the touched ㅂ/q input key 160 by detecting a predetermined key input value mapped to the signal set and outputs the key input value to the touch panel 111 (see FIG. 5).

Accordingly, the cover unit having an input unit according to the exemplary embodiment of the present disclosure does not need an additional power source to apply an input to the touch panel 111 because the connection between the connection surface 122 and the sensing unit 230 suffices for outputting an input generated from a touched area among a plurality of areas to the touch panel 111. In other words, as the touch sensing unit 150 of the cover unit 120 senses a user touch, electrode lines 152 transmit the sensed value to sensor units 231 and thus an input is provided to the touch panel 111. In addition, since an input can be applied to the touch panel 111 simply by configuring the touch sensing unit 230 on the cover unit 120, the cover unit 120 having an input unit is simplified in structure and slimmer and more lightweight than a conventional input device. Thus the cover unit 120 is more portable. Because the simplified touch sensing unit 150 is incorporated into the cover unit 120, the cover unit 120 having the input unit can be carried in engagement with the body 110 of the portable terminal. When needed, the input unit can be used just by opening the cover unit 120 at any place.

Figure 10:
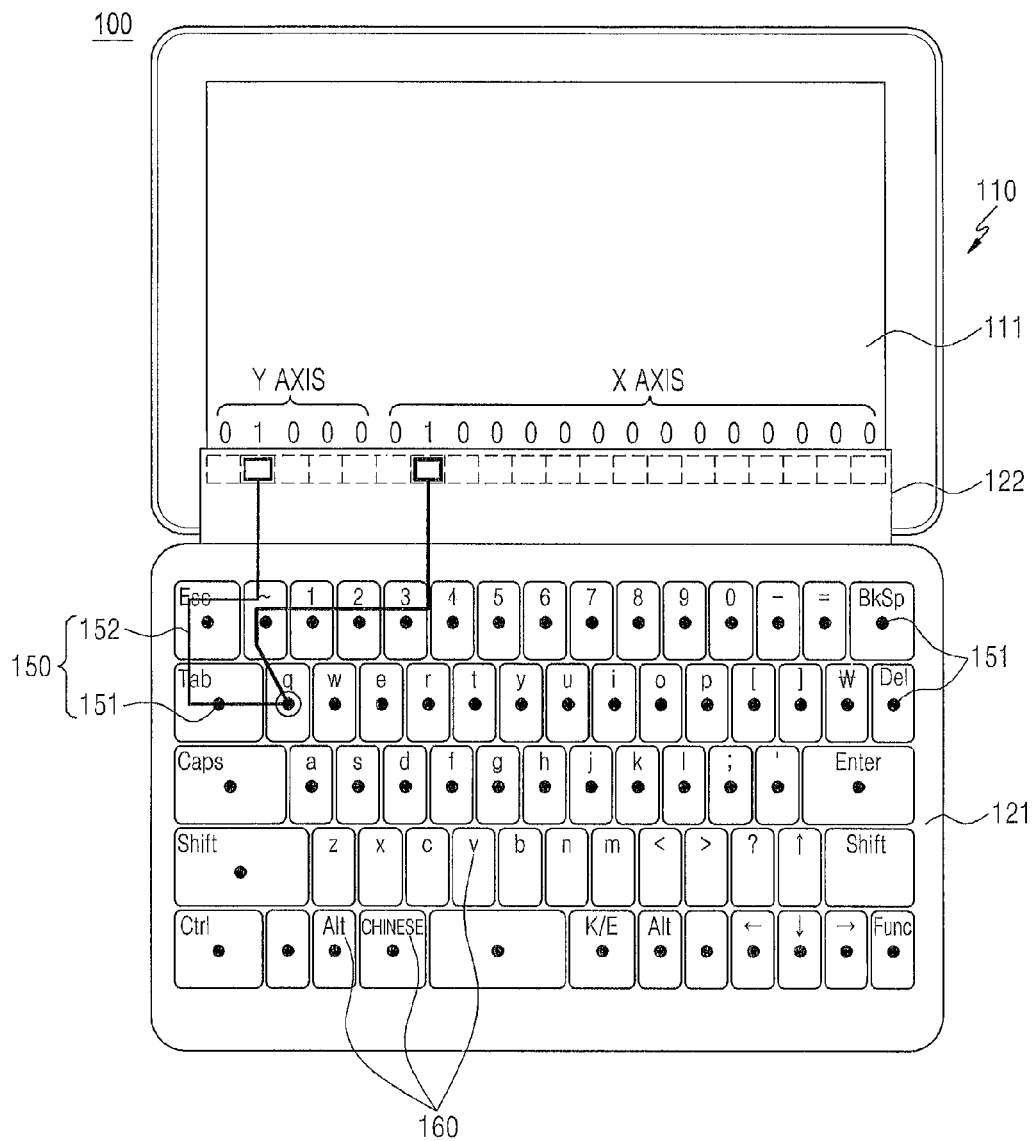
FIG. 10 illustrates a signal set created in a different manner from a signal set illustrated in FIG. 4 in the device illustrated in FIG. 7 according to embodiments of the present disclosure.

FIG. 10 illustrates a signal set created in a different manner from a signal set illustrated in FIG. 4 in the device illustrated in FIG. 7.

Referring to FIG. 10, while a touched input key 160 is recognized based on a set of binary signals in the afore-described exemplary embodiment of the present disclosure, the present disclosure is not limited thereto. For example, if the pattern of the electrodes 150 gets complicated due to an increase in the number of characters, the signal sensing surfaces 131 can be configured such that a set of binary signals have two-axis values. That is, the signal sensing surfaces 131 are divided into X-axis signal sensing surfaces 131 and Y-axis signal sensing surfaces 131. In this case, if the ㅂ/q input key 160 is touched, the sensing unit 130 senses a set of signals generated from the X-axis signal sensing surfaces 131 and signals generated from the Y-axis signal sensing surfaces 131, such as ((010000000000000), (01000)). Therefore, more input keys 160 are available.

As described above, a cover device having an input unit and a portable terminal having the cover device according to embodiments of the present disclosure can realize a touch on an electrode 151 as a signal set in a different manner. The number of the signal sensing surfaces 131 can vary with the number of the input keys 160. Obviously, the sensing unit 130 can control division of the signal sensing surfaces 131 arranged at predetermined intervals (e.g. equidistantly) by executing a specific function, for example, a specific application provided in the body 110 of the portable terminal.

When the signal sensing surfaces 131 are defined on the touch surface 110, they can be formed on the touch surface 110 by an additional application. That is, the 7 signal sensing surfaces 131 are formed on the touch surface 110 by the application and the connection surface 122 of the cover unit 120 is connected to the signal sensing surfaces 131. Thus, a signal from a touched electrode 150 is sensed by at least one of the signal sensing surfaces 131 through the application and the user input is realized by a set of signal values generated from the signal sensing surfaces 131 depending on whether they detect the signal from the touched electrode 150.

As is apparent from the above description of the present disclosure, because the input unit is incorporated into the cover device that covers the portable terminal, the use of the cover device in the portable terminal by connecting the cover device to the portable terminal obviates an additional power source for the cover device and allows an input to the portable terminal.

The cover unit having the input unit is simplified in structure and does not need a power source and its related component or structure. Therefore, the cover unit is slim, lightweight, and readily portable.

Since the sensing unit is formed at a portion of an existing touch panel by executing an application on the touch panel in order to sense reception or non-reception of a signal from an electrode via electrode lines, an input can be applied to the touch panel simply by connecting the connection surface to the sensing unit.

As the connection surface of the cover unit is simply provided to the portable terminal, an input can be applied to the portable terminal by a touch on an electrode in the cover unit. Therefore, the cover unit can be made to a different size and applied to different models. That is, the cover unit can be utilized in various ways.

At this point it should be noted that the exemplary embodiments of the present disclosure as described above typically involve the processing of input data and the generation of output data to some extent. This input data processing and output data generation can be implemented in hardware or software in combination with hardware. For example, specific electronic components can be employed in a mobile device or similar or related circuitry for implementing the functions associated with the exemplary embodiments of the present disclosure as described above. Alternatively, one or more processors operating in accordance with stored instructions can implement the functions associated with the exemplary embodiments of the present disclosure as described above. If such is the case, it is within the scope of the present disclosure that such instructions can be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A cover device having an input unit, comprising:
a cover unit divided into a plurality of areas, each area having an electrode;
a connection surface provided in the cover unit and configured to be detachably engaged with a terminal to which the cover unit is mounted; and
the input unit including an electrode line configured to transmit a touch input signal to a touch panel provided on the terminal through the electrode of a touched area among the plurality of areas,
wherein the connection surface is divided into a plurality of segments, and
wherein the electrode is connected to two different segments among the plurality of segments by two electrode lines.

2. The cover device of claim 1, wherein the plurality of segments spaced from one another by a predetermined distance, and the electrode line is configured to transmit an input signal from an electrode connected to the electrode line to the touch panel.

3. The cover device of claim 2, wherein binary signals generated by a user input are mapped to two different segments among the plurality of segments.

4. The cover device of claim 3, wherein input keys are arranged in a QWERTY layout.

5. The cover device of claim 2, wherein input keys representing key values are patterned in the plurality of areas on a surface of the cover unit.

6. A portable terminal having a cover device with an input unit, comprising:
a body having a touch panel;
a sensing unit provided in the body and configured to be detachably engaged with a connection surface of the cover device, to sense a signal through an electrode line formed in the connection surface; and
a controller configured to identify an input of at least one key according to a set of signals received from the sensing unit,
wherein the sensing unit includes a plurality of signal sensing surfaces arranged equidistantly at an edge of a surface of the touch panel, and
wherein an electrode corresponding to at least one key of the input unit is connected to two different signal sensing surfaces among the plurality of signal sensing surfaces.

7. The portable terminal of claim 6, wherein the sensing unit is configured to receive a signal generated from an electrode at an input position of the input unit through an electrode line connected to the electrode and electrode lines are connected to the sensing unit so that signal sets received from the electrodes have different key values.

8. The portable terminal of claim 7, wherein a number N of the signal sensing surfaces is determined so that a number of keys in the input unit to apply an input to the touch panel is equal to or less than $2^N$.

9. The portable terminal of claim 8, wherein the signal sensing surfaces is configured to output a set of binary signals corresponding to a key value of a user-input key.

10. The portable terminal of claim 8, wherein the sensing unit is configured to control division of the equidistant signal sensing surfaces according to execution of a specific function in the body.

11. The portable terminal of claim 7, wherein the sensing unit includes a plurality of sensors arranged adjacent to each other on a rear surface of the touch panel and the number N of the sensors is determined so that the number of keys in the input unit to apply an input to the touch panel is equal to or less than 2N.

12. The portable terminal of claim 11, wherein the sensors are capacitive sensors.

13. The portable terminal of claim 12, wherein an electrode corresponding to at least one key of the input unit is connected to two different sensors and the signal sensors is configured to output a set of binary signals corresponding to a key value of a user-input key.

14. A device comprising:
a body having a touch panel;
a cover unit divided into a plurality of areas in the body, each area having an electrode;
a connection surface provided in the cover unit and configured to be detachably engaged with the body;
electrode lines, each electrode line connecting an electrode to the connection surface to transmit a signal from the electrode to the connection surface;
a sensing unit provided in the body and configured to be detachably engaged with the connection surface, to sense a signal from an electrode line; and
a controller configured to receive signals received from the sensing unit and to recognize an input of at least one key based on a set of the signals,
wherein the connection surface is divided into a plurality of equidistant segments and each of the electrode lines is connected to two segments.

15. The device of claim 14, wherein the sensing unit is divided into a plurality of equidistant parts in the body and the parts face the segments of the connection surface and sense a signal from an electrode line.

16. The device of claim 15, wherein the sensing unit comprises a plurality of sensors sensing parts at a portion of the touch panel.

17. The device of claim 15, wherein the sensing unit comprises a plurality of sensors arranged adjacent to each other on a rear surface of the body.

18. The device of claim 17, wherein the plurality of sensors are capacitive sensors.

19. The device of claim 15, wherein upon detecting a touch, an electrode positioned in a touched area is configured to generate a signal and transmit the signal to a segment of the sensing unit connected to the electrode via an electrode line, and the controller is configured to provide an input signal to the touch panel by executing a key value corresponding to a set of signals received from the sensing unit.

20. The device of claim 14, wherein when the cover unit is attached to the body, a signal generated from an electrode is transmitted to the sensing unit via an electrode line connected to the electrode and the controller is configured to execute an input key value corresponding to a set of signals received from the sensing unit.

21. The device of claim 14, wherein input keys are patterned in the plurality of areas.

* * * * *